May 2, 1944.　　　　　　　B. R. HABEL　　　　　　2,347,683
NARROW GAUGE RAILROAD
Filed April 26, 1941　　　　2 Sheets-Sheet 1
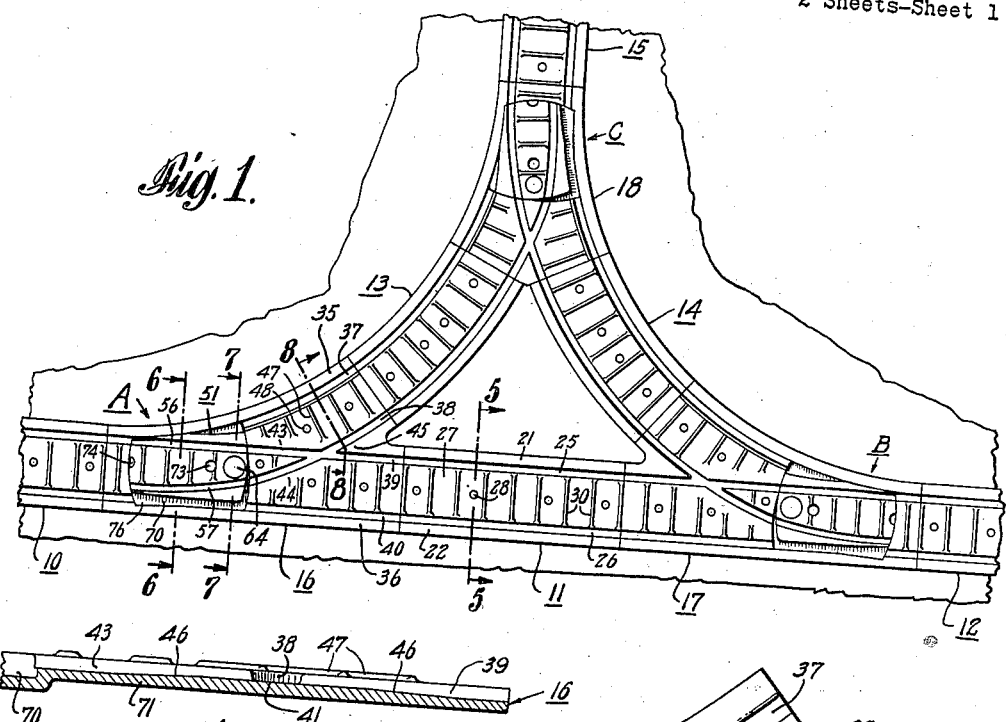
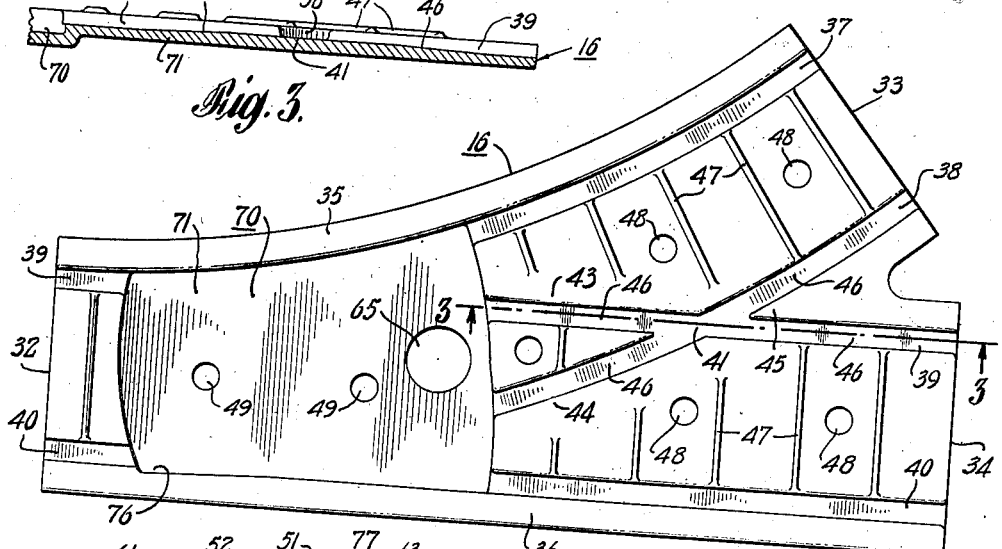
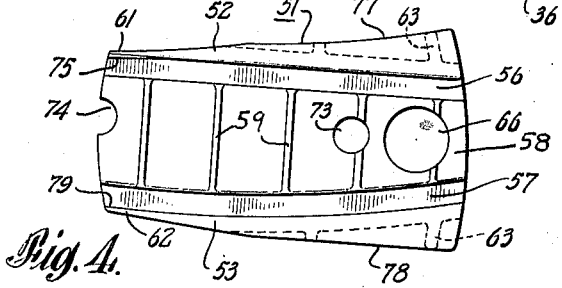
INVENTOR:
Berger R. Habel,
BY
Albert M. Austin
ATTORNEY

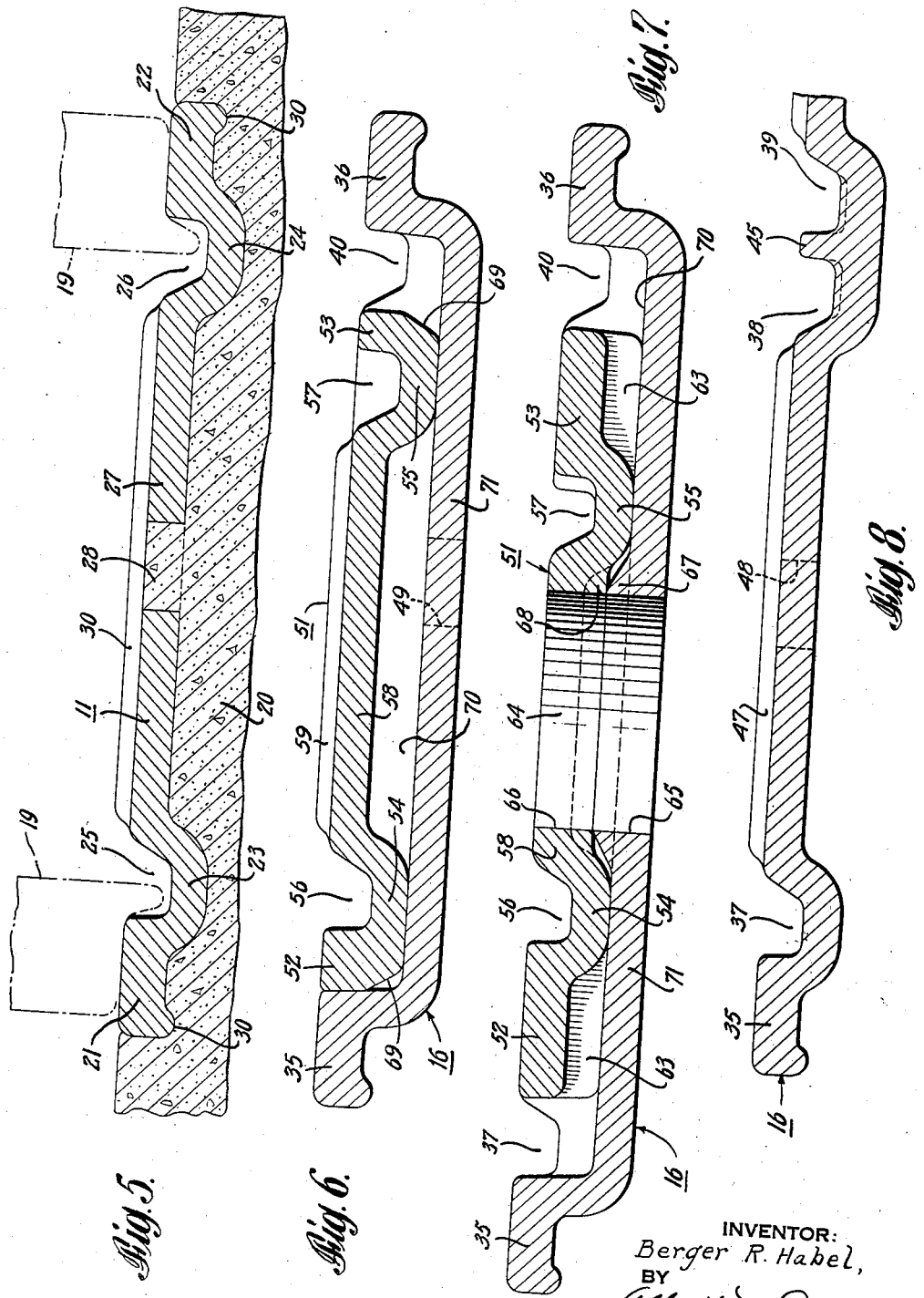

Patented May 2, 1944

2,347,683

UNITED STATES PATENT OFFICE 2,347,683

NARROW GAUGE RAILROAD

Berger R. Habel, Riverside, Ill., assignor to American Brake Shoe Company, a corporation of Delaware Application April 26, 1941, Serial No. 390,526

9 Claims. (Cl. 238—6)

The invention relates to railway track equipment and more particularly to equipment of the narrow gauge type commonly used in industrial plants. The invention also relates to switches or turnouts for switching cars from a main or tangent track to various side tracks connected to the main track.

In the form of the invention illustrated, the tangent track is connected to the side track by a Y-intersection utilizing three switches, although obviously the invention may be utilized in other relationships.

According to a preferred form, the track is made up of plain and switch sections suitably connected together as by embedding in the concrete floor of the plant. The plain sections are flat, plate-like castings, each comprising outer treadways for the wheel track and an inner walkway connected by U-shaped portions forming flangeways. The switch sections may be of similar construction having the frogs or intersections cast as a part thereof and having large recesses in which switch plates are pivoted. The switch plate comprises a casting generally similar to the plain and switch sections having outer treadways forming the switch points and a central walkway connected by U-shaped portions forming the flangeways. The treadways of the switch plate may be suitably pointed to form the switch points of the switch. To throw the switch the entire switch plate is moved as a unit, selectively bringing one or the other of its switch points and accompanying flangeway into cooperating position with the desired treadway and corresponding flangeway of the stationary switch plate.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 illustrates one form of track layout embodying the invention;

Fig. 2 is an enlarged view of a stationary switch plate with the movable switch plate removed;

Fig. 3 is a section on the line 3—3 of Fig. 2 illustrating the frog and riser construction;

Fig. 4 is a top plan view of the movable switch plate removed from the switch section;

Fig. 5 is a section taken on the line 5—5 of Fig. 1 illustrating one of the plain track sections;

Figs. 6 and 7 are sections taken through the switch illustrating the relationship between the movable and stationary switch plates; and Fig. 8 is a section taken through the stationary switch plate at a point removed from the switch.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and more particularly to Fig. 1, the particular layout taken to illustrate the invention comprises a stretch of tangent track, shown extending horizontally across Fig. 1, and a portion of branch track shown extending vertically of Fig. 1. The branch line is connected to the main line by a Y-intersection including three switches, indicated generally by A, B and C. This Y-intersection also comprises a plurality of plain sections, some straight and some curved. The straight sections are indicated by 10, 11, 12 and 15, and the curved sections are indicated by 13 and 14. The switches A, B and C are made up of stationary switch plates or sections indicated by 16, 17 and 18 having movable switch plates pivoted thereto as will appear more fully hereinafter.

Referring now to Fig. 5, a plain track section will first be described. The section 11, taken for purposes of illustration, is of plate-like configuration and made of cast iron or cast steel, cast manganese steel or other suitable material, and comprises the outer treadways 21 and 22 on which the wheels 19 of the rolling stock ride. The treadways 21 and 22 are connected by a central walkway 27 and U-shaped portions 23 and 24 forming the flangeways 25 and 26. The walkway 27 is of substantially the same height as the treadways 21 and 22 and has upwardly projecting transverse ribs or toe checks 30. These toe checks are for the purpose of assisting workmen in pushing cars along the track, the workmen engaging their feet against the toe checks to obtain sufficient purchase to push the cars.

The track section 11 is embedded in the concrete base, indicated by 20, forming part of the floor of the plant, the section having grout holes 28 in which the concrete is disposed to assist in anchoring the section firmly to the concrete floor. The outer edges of the treadways 21 and 22 have depending beads 30 for strengthening purposes and also to assist in anchoring the track section. The upper surfaces of the treadways 21 and 22 and of the walkway 27 are made substantially flush with the surrounding concrete floor to facilitate crossing the track by workmen and by vehicles.

Since the switches A, B and C are of similar construction, only one will be described in detail.

Referring now also to Figs. 6, 7 and 8, the switch A comprises the stationary plate or section 16 having a part indicated by 32, which might be called the "stem" and parts indicated by 33 and 34, which might be called "branches." Parts 32 and 34 form part of the tangent track and branch 33 leads to the branch line. The section 16 is of generally plate-like configuration and formed of cast iron or cast steel similar to the plain section 11. The section 16 has outer treadways 35 and 36, corresponding to the stock rails of an ordinary standard gauge railroad switch. The stem 32 has flangeways 39 and 40; the branch 33 has flangeways 37 and 38; the branch 34 has flangeways 39 and 40. The flangeways 38, 39 intersect to form the frog 41. The stationary switch plate 16 has inner treadways 43 and 44 interrupted by the frog 41 and forming the frog point 45. The stationary switch plate is provided with walkways having toe checks 47, some of which are shortened or broken to provide clearance for the flangeways and treadways.

It will be understood that the stationary switch plate 16 is suitably embedded in the concrete floor, being provided with grout holes 48 and 49, the latter being in the floor of the large recess 70 provided for the movable switch plate. It will be noted that the walkways on which the toe checks 47 are mounted are of the same height as the treadways, which in turn are flush with the surrounding floor.

The flangeways 37, 38, 39, 40, as well as the flangeways 25 and 26 of the plain sections, are sufficiently deep to clear the flanges of the wheels 19, as shown in Fig. 5. However, at the frog 41, for the purpose of supporting the wheels where the treadways are interrupted, four risers, indicated by 46, are provided at the bottom of the flangeways 38 and 39 on opposite sides of the frog 41, this being indicated also in Fig. 3.

For housing the movable switch plate, the stationary switch plate 16 is provided with an enlarged shallow recess, indicated by 70, the bottom plate 71 connecting the treadways 35 and 36 being depressed sufficiently to house the flat movable switch plate 51 and to provide a smooth surface on which it may slide. The switch plate 51 comprises switch tongues or treadways 52 and 53 to which are connected U-shaped portions 54, 55 forming flangeways 56 and 57, which in turn are connected by the walkway 58 having the toe checks 59. The switch tongues 52 and 53 are narrowed at one end to form the switch points 61 and 62. The treadways 52 and 53 are widened at their other ends, the undersides of which are provided with strengthening ribs indicated by 63. The U-shaped portions 54, 55 and the ribs 63 provide a stable support for the movable switch plate preventing it from tipping or tilting in use.

The movable switch plate 51 is pivoted in the recess 70 by a pivot member 64 engaging in aligned openings 65, 66 in plates 71 and 58. The plug or pivot member 64 may be of solid one-piece construction or it may be formed of two discs, as shown in Fig. 7, each half of the length of the finished pivot, suitably welded together. This pivot member 64 may be suitably welded or otherwise secured into either one or the other of the switch members and swiveling in the other. In some cases it may be desirable to secure the pivot member 64 to the lower switch plate, permitting the swiveling action in the upper switch plate so as to facilitate lubrication of this pivot. It will be noted that the lower plate 71 is provided with a raised or hub portion 67 surrounding the hole 65 and that the movable plate 58 is provided with a similar enlarged portion 68 surrounding the hole 66 for strengthening the pivot construction.

It will be noted that the edges of the movable switch plate 51 are cut away as at 69 (Fig. 6) to provide clearance spaces to insure full movement of the switch to completely closed position in spite of any dirt or small foreign matter that may become lodged in the large recess 70.

A hole 73 and a notch 74 are provided in the movable switch plate 51 for the purpose of assisting in moving the switch from one thrown position to the other, it being understood that a suitable tool (not shown) may be provided for throwing the switch.

It will be noted that the movable switch plate 51 of switches A and B has one straight flangeway 56 and one curved flangeway 57, while the movable switch plate of switch C has two curved flangeways. Furthermore, it will be noted that the construction of the switch points and mating stationary treadways are somewhat different in the several switches. It will be understood that these differences result from differences in the curvature of the connecting tracks and that construction will be used in practice which it is best adapted for the particular position of a switch and curvature of the connecting track.

For example, switch point 61 of switch A is strengthened by additional metal on the gauge side to form the reenforcement indicated by 75. In this case there is no recess in the wall of treadway 35. Switch point 62, on the other hand, is strengthened by casting with additional metal on the outside of the point, the mating treadway 36 being recessed at 76 to accommodate the point 62.

To use the switch, the movable switch plate will be thrown to the desired position as will be understood by those skilled in the art. Switches A and B in Fig. 1 are shown thrown for through traffic on the tangent track. Switch C is thrown for traffic on the right-hand branch of the Y-intersection.

It will be noted from switch A that the treadways 52 and 43 and corresponding flangeways 56 and 39 meet and register for traffic on the tangent track and that the wheels pass onto the movable switch plate and off of it without jar or shock. The risers on the frog 41 prevent shock or jar at this point by supporting the wheels as their treads cross the intersecting flangeway.

When the switch A is thrown for traffic to the branch, the switch point 62 will be thrown against the treadway 36 and the flangeways 57 and 38 and corresponding treadways will be brought into register and meeting engagement so that the cars may pass from the movable switch plate to the stationary switch section without jar or shock.

Suitable means (not shown) may be provided for locking the switches in thrown position but in many cases this is not necessary, particularly when single cars pass over the switch at slow speed. In the event a switch is not set for the desired switching operation, provision is made for causing a car trailing the switch to throw it automatically. Assume, for example, that it is desired to move a car from section 13 to section 10 with switch A in the position shown in Fig. 1. The car wheel flanges engaging the side wall of flangeway 57 and the edge 77 of treadway 52 apply force to these parts in such direction to throw the movable switch plate to engage switch point 62 with treadway 36. Similarly, if switch A be set for branch line traffic, the wheel flanges of a car passing from section 11 to section 10, trailing the switch, will engage the side wall of flangeway 56 and the edge 78 of treadway 53 to automatically throw the switch to traffic for the main line.

The invention provides a track structure in which the treadways, corresponding to the rails of the ordinary standard guage railroad, are permanently held in fixed position with respect to each other, thereby insuring the maintenance of correct track gauge at all times. The integral cast construction permits the building of heavy wear-resisting track members, which are especially important in the switches, for preventing premature wear of the switch points and cooperating treadways against which the switch points are selectively moved. The placing of the walkways on both stationary sections and switch plates, even with the treadways and the location of the latter flush with the adjoining floor, facilitates both foot and wheel traffic crossing the tracks in cases where the plant also uses vehicles not adapted to run on rails. The construction lends itself nicely to the casting of the toe checks which are important to provide purchase for the workmen pushing the cars running on the tracks.

While certain novel features of the invention have been disclosed and are pointed out in the annexed claims, it will be understood that various omissions, substitutions and changes may be made by those skilled in the art without departing from the spirit of the invention.

What is claimed is:

1. In a narrow gauge railway, a switch section comprising a stationary plate-like member having a stem end and branch ends, each end having treadways, the inner treadways of said branch ends intersecting to form a frog, said member having an extensive shallow recess between said stem end and said frog and between the outer treadways of said stem, a switch plate in said recess comprising a plate-like casting having outer treadways and an inner walkway connected by U-shaped portions forming flangeways, said switch plate having a pivoted end and a free end, said switch plate treadways being widened and having reenforcing ribs on the underside at said pivoted end, said switch plate treadways tapering to form switch points at said free end, said switch section and said switch plate having pivot openings near said frog and between the converging flangeways of said switch plate, and a pivot in said pivot openings.

2. In a railway, a switch section comprising outer and inner treadways, said inner treadways intersecting to form a frog, a switch plate adjacent said section, said section having an extensive shallow recess between said outer treadways in which said switch plate is disposed, said switch plate comprising a plate-like casting having outer treadways and an inner walkway connected by U-shaped portions forming flangeways, said switch plate having a pivoted end and a free end, said switch plate treadways being widened and having reenforcing ribs on the underside at said pivoted end, said switch plate treadways tapering to form switch points at said free end, said switch section and said switch plate having pivot means near said frog and between the converging flangeways of said switch plate, whereby said switch plate may be thrown to bring its flangeways selectively into register with the flangeways of said stem end.

3. In a railway, a switch section comprising a stationary plate-like member having a stem end and branch ends, each end having outer treadways and central walkways connected by depressed portions forming flangeways, the inner flangeways of said branch ends intersecting to form a frog at which point the corresponding inner treadways are interrupted, said member having an extensive shallow recess between said stem end and said frog and between the outer treadways of said stem, a switch plate in said recess comprising a plate-like member having outer treadways and an inner walkway connected by depressed portions forming flangeways, said switch plate having a pivoted end and a free end, said switch plate treadways tapering to form switch points at said free end, said switch section and said switch plate having pivot means near said frog and between the converging flangeways of said switch plate, whereby said switch plate may be thrown to bring its flangeways selectively into register with the flangeways of said stem end.

4. In a narrow gauge railway, a switch section comprising a stationary plate-like casting having a stem end and branch ends, each end having outer treadways and central walkways connected by U-shaped portions forming flangeways, the inner flangeways of said branch ends intersecting to form a frog at which point the corresponding inner treadways are interrupted, said flangeways being for the most part sufficiently deep to clear the wheel flanges but having riser portions on opposite sides of said frog to support the wheel flanges as they cross said frog, said casting having an extensive shallow recess between said stem end and said frog and between the outer treadways of said stem, a switch plate in said recess comprising a plate-like casting having outer treadways and an inner walkway connected by U-shaped portions forming flangeways, said switch plate having a pivoted end and a free end, said switch plate treadways being widened and having reenforcing ribs on the underside at said pivoted end, said switch plate treadways tapering to form switch points at said free end, said switch section and said switch plate having pivot means near said frog and between the converging flangeways of said switch plate, whereby said switch plate may be thrown to bring its flangeways selectively into register with the flangeways of said stem end.

5. In railway track construction, a plurality of sections of track, each section comprising a flat, plate-like integral member having integral outer treadways and a central walkway connected by U-shaped portions forming flangeways, said walkways being at substantially the same height as said treadways, transversely extending upstanding ridges formed integral with said treadways, said ridges being sufficiently widely spaced lengthwise of the track to form toe checks, and a foundation to which said sections are secured to hold said sections in alignment, said foundation being disposed under said sections and having its adjacent top surface substantially co-extensive with said treadways.

6. In narrow gauge railway track construction, a plurality of sections of track, each section comprising a flat, plate-like casting having integral outer treadways and a central walkway connected by U-shaped portions forming flangeways, said walkways being at substantially the same height as said treadways and having spaced, transversely extending, upwardly projecting ribs forming toe checks, said walkways having a series of grout holes and said treadways having depending outer beads, and a concrete base in which said sections are embedded to hold said sections in alignment, said base being disposed under said sections and having portions disposed in said grout holes and having its adjacent top surface substantially co-extensive with said treadways.

7. In an industrial railway, a switch section comprising a stationary plate-like member having a stem end and branch ends, each end having outer treadways and a central walkway connected to the treadways by depressed U-shaped portions forming flangeways, said member having a depressed bottom wall forming an extensive shallow recess between said stem end and said branch ends, a unitary switch plate in said recess and resting on said bottom wall, said switch plate comprising a plate-like member having outer treadways and an inner walkway connected to the outer treadways by depressed U-shaped portions forming flangeways, said switch plate treadways tapering to form switch points at said stem end, and means whereby said switch plate may be thrown to convey traffic from said stem end selectively to said branch ends, all of said treadways and walkways being at substantially the same level.

8. In an industrial railway, a switch section comprising a stationary plate-like member having a stem end and branch ends, each end having outer treadways and a central walkway connected to the treadways by depressed U-shaped portions forming flangeways, said member having a depressed bottom wall forming an extensive shallow recess between said stem end and said branch ends and between the outer treadways of said stem end, a unitary switch plate in said recess and resting on said bottom wall, said switch plate comprising a plate-like member having outer treadways and an inner walkway connected to the outer treadways by depressed U-shaped portions forming converging flangeways, said switch plate having a pivoted end and a free end, said switch plate treadways tapering to form switch points at said free end, pivot means connecting said switch plate between the converging flangeways thereof and said switch section near the branch ends thereof, whereby said switch plate may be thrown to bring its flangeways selectively into register with the flangeways of said stem end, all of said treadways and walkways being at substantially the same level.

9. In an industrial railway, a switch section comprising a stationary plate-like member having a stem end and branch ends, each end having outer treadways and a central walkway connected to the treadways by depressed U-shaped portions forming flangeways, the adjacent flangeways of said branch ends intersecting to form a frog at which point the corresponding treadways are interrupted, said member having a depressed bottom wall forming an extensive shallow recess between said stem end and said frog and between the outer treadways of said stem end, a unitary switch plate in said recess and resting on said bottom wall, said switch plate comprising a plate-like member having outer treadways and an inner walkway connected to the outer treadways by depressed U-shaped portions forming converging flangeways, said switch plate having a pivoted end and a free end, said switch plate treadways tapering to form switch points at said free end, said switch plate treadways being widened at siad pivoted end to provide increased bearing surface on said bottom wall, pivot means connecting said switch plate between the converging flangeways thereof and said switch section near the frog thereof, whereby said switch plate may be slid on said bottom wall to bring its flangeways selectively into register with the flangeways of said stem end.

BERGER R. HABEL.